US008527136B2

(12) United States Patent
Kusano

(10) Patent No.: US 8,527,136 B2
(45) Date of Patent: Sep. 3, 2013

(54) VEHICULAR ACTION DATA RECORD APPARATUS

(75) Inventor: Ryuki Kusano, Kariya (JP)

(73) Assignee: Denso Corporation, Kariya (JP)

( * ) Notice: Subject to any disclaimer, the term of this patent is extended or adjusted under 35 U.S.C. 154(b) by 153 days.

(21) Appl. No.: 13/303,289

(22) Filed: Nov. 23, 2011

(65) Prior Publication Data

US 2012/0136526 A1 May 31, 2012

(30) Foreign Application Priority Data

Nov. 26, 2010 (JP) ................................ 2010-263975

(51) Int. Cl.
*G01M 17/00* (2006.01)

(52) U.S. Cl.
USPC ....... 701/29.2; 701/30.2; 701/31.4; 701/32.2; 701/32.4

(58) Field of Classification Search
USPC ..................... 701/29.2, 30.2, 31.4, 32.2, 32.4
See application file for complete search history.

(56) References Cited

U.S. PATENT DOCUMENTS

2004/0243368 A1 12/2004 Hiemer et al.

FOREIGN PATENT DOCUMENTS

JP 2003-312553 11/2003

*Primary Examiner* — James P Trammell
*Assistant Examiner* — Majdi Alsomiri
(74) *Attorney, Agent, or Firm* — Nixon & Vanderhye PC

(57) ABSTRACT

When anomalous vehicle actions occur in a vehicle multiple times, it is determined whether each action data is included in a series of action data sets that are closely related mutually or an irrelevant independent action data set. When it is included in the series of action data sets, the ECUs record the series of action data sets in respective own memories according to a predetermined recording order. In contrast, when it is included in the independent action data set, an earliest ECU that is earliest in the recording order records the action data by overwriting its own memory. In this case, the earliest ECU transmits an instruction to other ECUs to delete all past action data that are recorded in own memories of the other ECUs.

4 Claims, 3 Drawing Sheets

VEHICULAR ACTION DATA RECORD APPARATUS

CROSS REFERENCE TO RELATED APPLICATION

The present application is based on and incorporates herein by reference Japanese Patent Application No. 2010-263975 filed on Nov. 26, 2010.

FIELD OF THE INVENTION

The present invention relates to a vehicular action data record apparatus which records action data relevant to an anomalous action of a vehicle.

BACKGROUND OF THE INVENTION

[Patent document 1] JP-2003-312553 A

For example, Patent document 1 describes a vehicular data record apparatus which records vehicle information before and after an emergency such as an action sudden change. This vehicular data record apparatus contains a vehicle data storage area having several rewritable archive blocks where vehicle data are rewritable, and an action sudden change occurrence detection device which detects an occurrence of a vehicular action sudden change such as an anomalous start-up and a sudden deceleration movement, which do not result in an accident.

The apparatus selects a archive block in the vehicle data storage area, and records vehicle data one by one in the selected archive block. When it is detected that a check-needed state such as an action sudden change occurs in the vehicle, another archive block is newly selected and the recording of vehicle data is then started. In such a case, the recording to the archive block that has been used before the check-needed state is detected is stopped after a predetermined time period elapses since the check-needed state is detected. Thus, even when the check-needed states occur successively, the vehicle data can be stored appropriately.

In the above vehicular data record apparatus, only on the condition that an action sudden change arises, the vehicle data at the time of the action sudden change is recorded in a single archive block, and the archive destination of the vehicle data is changed into another archive block. Such changes of the archive blocks may result in a state where the vehicle data are recorded in all the archive blocks. In this case, when another new vehicle data needs to be further recorded, the vehicle data is written over the archive block which records the oldest vehicle data.

An example is considered that a sudden acceleration occurs in a vehicle because a driver mistakenly steps on an accelerator pedal instead of a brake pedal. In such a case, a driver becomes in a panic state since the vehicle accelerates suddenly although the driver believes to have stepped on the brake pedal. The driver may further repeat mistakes such as stepping on the accelerator pedal farther or repeating of stepping on the accelerator pedal. In the case of stepping on the accelerator farther, the vehicle further accelerates; in the case of repeating of stepping on the accelerator pedal, the vehicle decelerates suddenly when departing from the pedal and accelerates suddenly when repeating of stepping on the pedal.

In order to correctly execute an after-the-fact analysis of the cause of such a state, it is desirable to obtain a series of or a group of vehicle data chronologically from when the first sudden acceleration occurs to when the anomalous action of the vehicle arises thereafter.

However, the vehicular data record apparatus in Patent document 1 changes the archive destination into a different archive block only on the condition that an action sudden change arises, as mentioned above. Thus, a series of vehicle data and an independent vehicle data irrelevant to the series of vehicle data may be recorded in a mutually mixed state. In other words, both the series of vehicle data and the different independent vehicle data are recorded at the same time in the vehicle data storage area; thus, it becomes difficult to investigate a true cause of the vehicle action sudden change.

SUMMARY OF THE INVENTION

The present invention is made in view of the above-mentioned situation. It is an object to provide a vehicular action data record apparatus to easily differentiate from each other a series of action data relevant to vehicle actions and another independent action data other than the series of action data.

To achieve the above object, according to an aspect of the present invention, a vehicular action data record apparatus for a vehicle is provided as follows. An action data output section is included to output action data relevant to an action of the vehicle. A record section is included to record the action data. An anomaly determination section is included to determine whether an action of the vehicle is anomalous based on the action data outputted by the action data output section to identify an anomalous action. A record control section is included to execute a record process to cause the record section to record action data relevant to an anomalous action of the vehicle when the anomalous action is identified by the anomaly determination section. The record section contains a plurality of archive areas, each of which is enabled to record a single action data set that contains at least one action data relevant to an anomalous action. The plurality of archive areas are enabled to record the action data sets, respectively, in a predetermined recording order relative to the record process. In cases that an occurrence time interval between adjacent anomalous actions that are identified by the anomaly determination section is within a predetermined time period, the record control section is further configured to cause the record section to record action data sets relevant to the adjacent anomalous actions, which are identified by the anomaly determination section, in different archive areas of the plurality of archive areas according to the recording order, respectively. In contrast, in cases that an occurrence time interval between adjacent anomalous actions that are determined by the anomaly determination section exceeds the predetermined time period, the record control section is further configured to cause the record section to record a newer action data set relevant to a newer anomalous action of the adjacent anomalous actions, which are identified by the anomaly determination section, by overwriting an earliest ordered archive area, which is earliest in the recording order among the plurality of archive areas, and to cause other archive areas, which is among the plurality of archive areas and other than the earliest ordered archive area, to erase all past action data sets that are recorded in the other archive areas, respectively.

Under such a configuration, when anomalous vehicle actions occur consecutively within a predetermined time period or interval between the adjacent two anomalous vehicle actions, the action data corresponding to the occurring anomalous vehicle actions are regarded as a series of vehicle action data or data sets. When it is determined that the action data belongs to a series of action data sets, the record control section records the series of action data sets in the different archive areas, respectively, according to the predetermined recording order. In contrast, when the occurrence time interval between the adjacent two anomalous exceeds the predetermined time period, the action data relating to a newly occurring anomalous vehicle action is regarded as belonging to independent action data. This independent action data is recorded by overwriting the archive area having an earliest recording order. At the same time, all the past recorded data are erased in other archive areas other than the earliest archive area.

Therefore, in the above vehicular action data record apparatus, the record section only records either (i) a series of action data or (ii) an independent action data. Therefore, it is clearly distinguishable whether the recorded action data belongs to a series of action data or an independent action data. Further, with respect to the series of action data or data sets, the action data sets of the series of action data are recorded in the several different archive areas, respectively, in the predetermined recording order; thus, the action data sets can be easily obtained in a chronological order.

Further, the following is noted. There is a case where even though an anomalous vehicle action occurs to thereby record the corresponding action data, the vehicle is thereafter normally used again and a new anomalous action occurs. In such a case, the older recorded action data is unnecessary for analysis; a new action data should be recorded preferentially. Therefore, in the above vehicular action data record apparatus, when the new anomalous action occurs, the action data at that time is recorded and the past stored action data are canceled or erased.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, a vehicular action data record apparatus according to an embodiment of the present invention is explained with reference to drawings.

Figure 1:
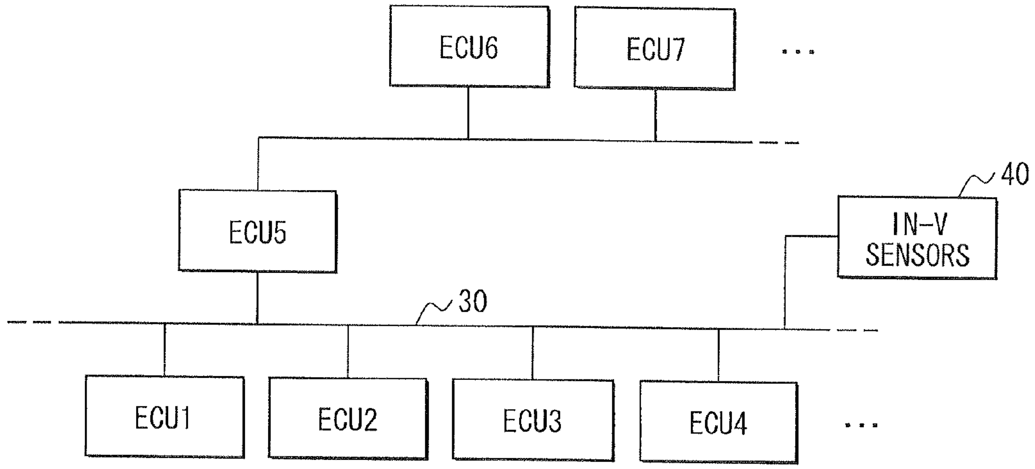
FIG. 1 is a block diagram illustrating a configuration of a vehicular action data record apparatus according to an embodiment of the present invention.

FIG. 1 is a block diagram illustrating a configuration of a vehicular action data record apparatus according to an embodiment of the present invention. The vehicular action data record apparatus of the present embodiment includes various kinds of electronic control units (ECUs) 1 to 7, each of which controls electronically in-vehicle apparatuses mounted in a subject vehicle. The ECUs 1 to 7 are connected in a network with each other via communication links or lines such as an in-vehicle LAN 30. In addition, the ECU 5 of the ECUs 1 to 7 also serves as a gateway unit.

The ECUs 1 to 7 control respective in-vehicle apparatuses (i.e., control target apparatuses), which include the following: power train related apparatuses such as an engine, a transmission, and a brake; body related apparatuses such as an air-conditioner, a seat, and a door lock; information related apparatuses, such as a navigation apparatus, an electronic toll collection use apparatus, and a radio set; and safety related apparatuses such as an airbag.

Each ECU 1 to 7 receives a signal from various kinds of in-vehicle sensors 40 in order to control each control target apparatus. In this case, each of the various kinds of sensors may be connected to a single ECU among the ECUs 1 to 7, thereby transmitting a signal to the other ECUs 1 to 7 via the single ECU 1 to 7. The sensor itself may be connected to the communication link or line, thereby transmitting a signal to one of the ECUs 1 to 7.

In the vehicular data record apparatus according to the present embodiment, the ECUs 1 to 7 record, as action data, signals from the sensors that output signals relevant to an action of the vehicle when the vehicle exhibits an anomalous action.

In particular, in the vehicular data record apparatus according to the present embodiment, a case arises that several anomalous vehicle actions arise consecutively in a passage of time. In such a case, the vehicular action data record apparatus determines whether each action data belongs to a series of action data which are closely related mutually or an independent action data that is slightly related or unrelated with another action data. When it is determined that the action data belongs to a series of action data, the ECUs 1 to 7 record the series of action data in respective own memories according to a predetermined recording order. That is, in the present embodiment, a recording order to record action data is predetermined with respect to each of the ECUs 1 to 7. The ECU corresponding to the present recording order executes a record process of the action data to be explained later.

It is noted, the wording of "action data" is explained as follows, for easy understanding. When the above case arises that several anomalous vehicle actions arise consecutively in a passage of time, the action data relevant to each arising anomalous vehicle action may be a single action data (i.e., a single action data element) or several action data (i.e., several action data elements). Thus, an "action data set" relevant to one anomalous vehicle action may be defined as indicating the single action data element and/or the several action data elements; namely, the action data set includes at least one action data or at least one action data element. That is, the vehicular action data record apparatus determines whether each action data set belongs to or is included in (i) a series of action data sets which are closely related mutually or (ii) an independent action data set that is slightly related or unrelated with another action data set. When it is determined that the action data set belongs to or is included in a series of action data sets, the ECUs 1 to 7 record the several action data sets in the series of action data sets in own memories, respectively, according to the predetermined recording order. That is, in the present embodiment, a recording order to record the several action data sets is predetermined with respect to each of the ECUs 1 to 7. The ECU corresponding to the present recording order executes a record process of recording the action data set to be explained later.

When it is determined that the data belongs to an independent action data or data set, the ECU 1 having the earliest number in the recording order executes an overwrite record to write the action data in the own memory for recording. In this case, the ECU 1 having the earliest number in the recording order transmits an instruction (i.e., notice) to the other ECUs 2 to 7 to delete all the past action data.

Thus, according to the vehicular data record apparatus of the present embodiment, either a series of action data sets or an independent action data set is only recorded in the memories of the ECUs 1 to 7; the series of action data sets and the independent action data set are not recorded in a mixed state. Therefore, it is clearly distinguishable whether the recorded action data set belongs to a series of action data sets or an independent action data set. In the case of the series of action data sets, the series of action data sets are recorded in each of the memories of the ECUs 1 to 7 according to the predetermined recording order; thus, the series of action data sets can be serially acquirable easily.

The memories of the ECUs 1 to 7 for recording the action data are non-volatile. Even if the ignition switch of the vehicle is turned into an OFF state and the power supply to the ECUs 1 to 7 is stopped, each ECU 1 to 7 can hold the recorded action data. In addition, each ECU 1-7 may once record action data in volatile memory, and then writes the action data, which are stored in the volatile memory, into a non-volatile memory at a suitable time point such as a time point when an ignition switch is turned into an OFF state, for instance. It is noted that each ECU 1 to 7 writes action data (i.e., action data elements or an action data set) that is detected with predetermined time intervals (for example, every one second) in each own memory.

The action data recorded in the memory of each ECU 1 to 7 include signals of sensors which detect manipulations, which are made by a driver of the vehicle and affect actions of the vehicle. Such sensors, for example, include an accelerator pedal sensor that detects an amount of stepping-on of an accelerator pedal; a brake pedal sensor that detects an amount of stepping-on of a brake pedal; a shift position sensor that detects a shift position of a transmission; and a steering sensor that detects a steering angle of a steering wheel. In addition, the action data further include signals of the sensors which directly detect actions of the vehicle. Such sensors include, for instance, a speed sensor that detects a travel speed of the vehicle; an acceleration sensor that detects an acceleration in a longitudinal direction (i.e., vehicle back and forth direction) and a lateral direction (i.e., a vehicle width direction) of the vehicle; and a yaw rate sensor that detects a change speed in a direction of rotation of the vehicle. Furthermore, the action data may include operation signals (or actuating signals) of various control units of the vehicle. Such action data include an operation signal of a power steering control unit; an operation signal of a brake control unit; an operation signal of a transmission control unit; and an operation signal of an engine control unit. The operations of these control units cause the changes in an assist amount of the power steering apparatus, a braking force of the brake apparatus, a gear ratio of the transmission, a torque in the engine, thereby varying the action of the vehicle according to the caused changes.

The memory of each ECU 1 to 7 can record an action data set containing at least one action data or data element for a first predetermined time period. When executing a record process of action data (also referred to as an action data record process), each ECU 1 to 7 writes action data in its own memory in the endless loop. Simultaneously, it is determined whether an anomalous action occurs in the vehicle based on the action data. The anomalous actions of the vehicle (also referred to an anomalous vehicle action) include a sudden acceleration of the vehicle, a sudden deceleration (quick stop), and a steep turn. When it is determined that an anomalous action occurs in the vehicle based on the action data, the recording of the action data is stopped at a time point when a second predetermined time period elapses since the occurrence of the anomalous action. As a result, the memory of each ECU 1 to 7 comes to record (i) first action data (also referred to as a before-the-occurrence action data) that are recorded for a time period of the first predetermined time period minus the second predetermined time period before the occurrence of the anomalous action, and (ii) second action data (also referred to as an after-the-occurrence action data) that is recorded for the second predetermined time period since the occurrence of the anomalous action.

Thus, the action data recorded in the memory of each ECU 1 to 7 may be analyzed to thereby help investigate the cause that the anomalous action occurs in the vehicle.

Figure 2:
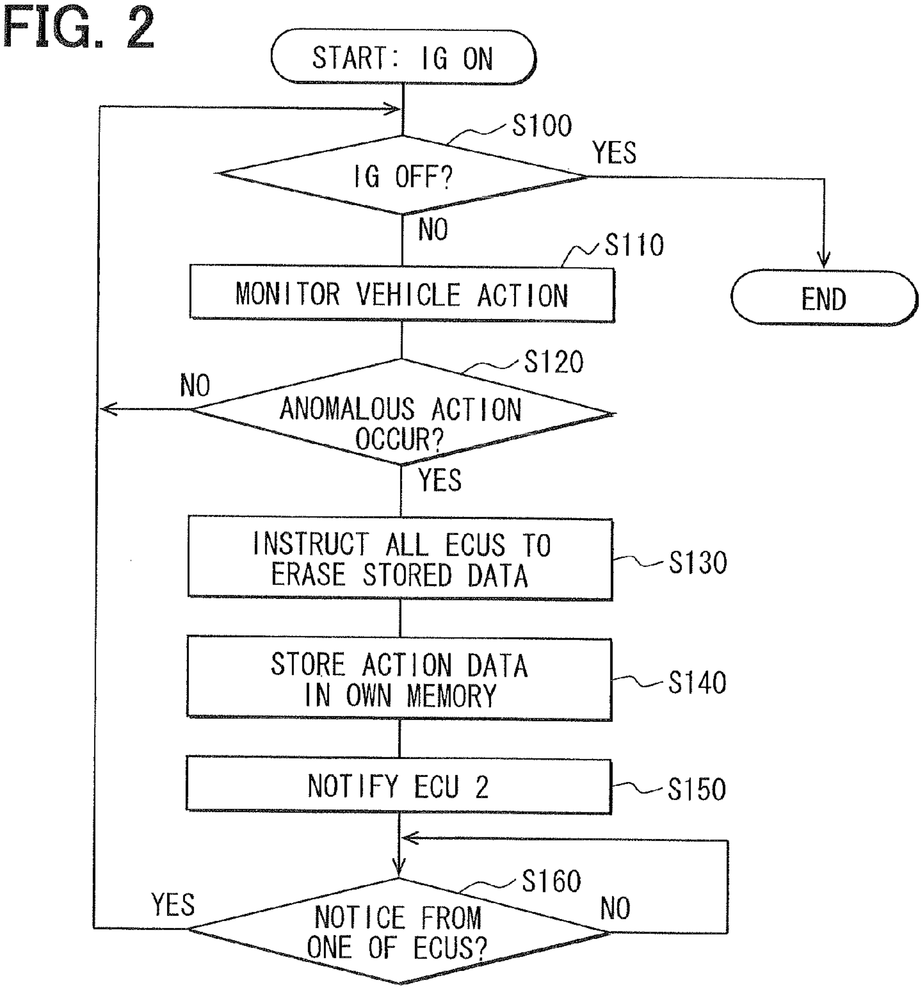
FIG. 2 is a flowchart diagram illustrating a record process of recording action data which is executed by an electronic control unit whose record order is earliest.
Figure 3:
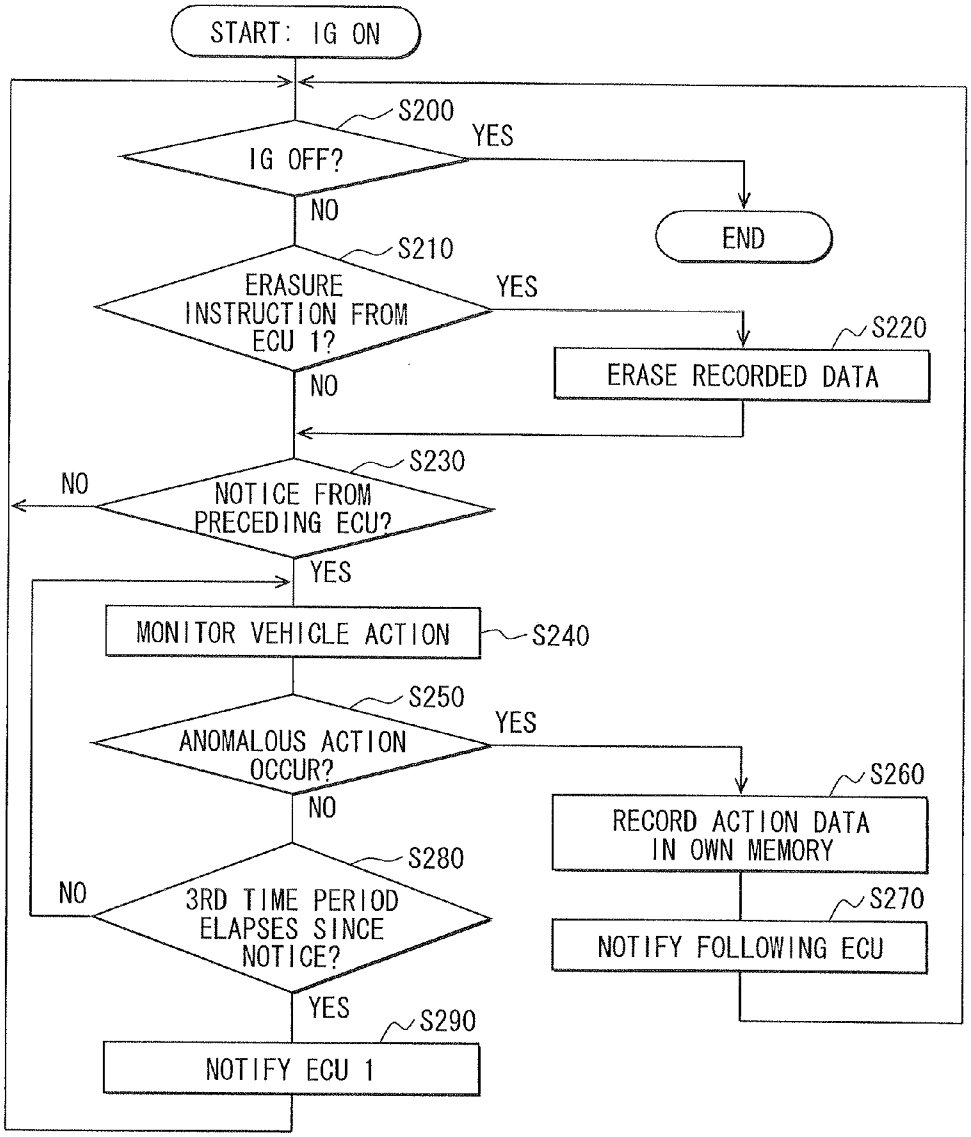
FIG. 3 is a flowchart diagram illustrating a record process of recording action data which is executed by another electronic control unit whose record order is not earliest.
Figure 4:
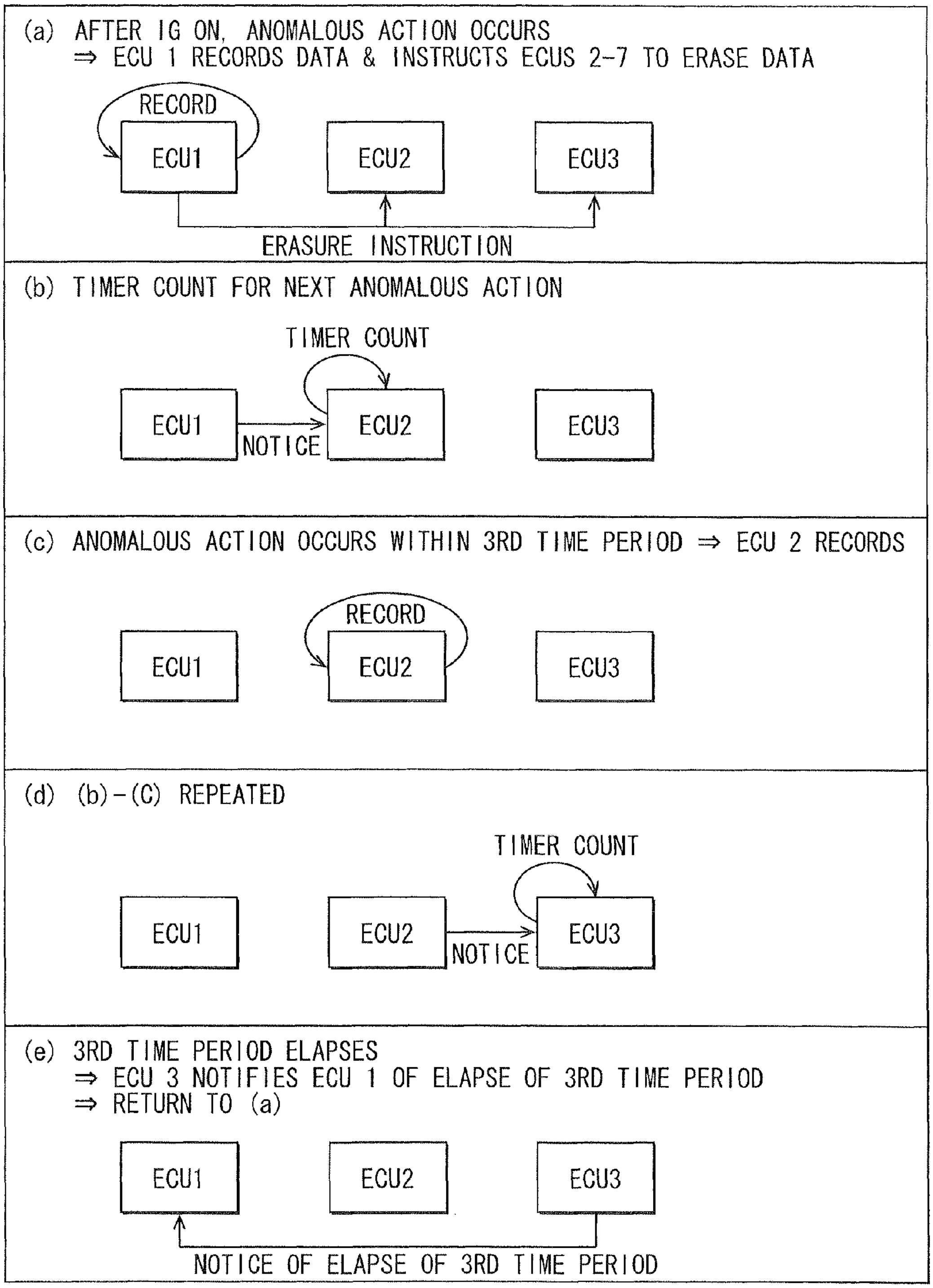
FIG. 4 is a diagram for explaining operations of electronic control units.

The following explains a record process executed in each ECU 1 to 7 for recording action data in the action data record apparatus according to the present embodiment with reference to flowcharts of FIGS. 2 and 3, and an operation explanation diagram of FIG. 4. The flowchart of FIG. 2 indicates an action data record process executed by the ECU 1 that is earliest in the recording order among the ECUs 1 to 7. The ECU 1 may be referred to as an earliest ordered ECU or an earliest ECU. The flowchart of FIG. 3 indicates the action data record process executed by a subject ECU that is one of other ECUs 2 to 7 other than the ECU 1. The subject ECU may be referred to as not-earliest ordered ECU or a not-earliest ECU, or a subsequent ECU. In addition, the following explains the case where seven ECUs 1 to 7 are used, the number of the ECUs is optional and not needed to be limited to seven.

First, with reference to FIG. 2, an action data record process of recording action data is explained with respect to the ECU 1 having an earliest recording order.

It is further noted that a flowchart or the processing of the flowchart in the present application includes sections (also referred to as steps), which are represented, for instance, as S100. Further, each section can be divided into several subsections while several sections can be combined into a single section. Furthermore, each of thus configured sections can be referred to as a device, means, module, or processor and achieved not only as a software section in combination with a hardware device but also as a hardware section. Furthermore, the software section may be included in a software program, which may be contained in a non-transitory computer-readable storage media as a program product.

As indicated in the flowchart of FIG. 2, the record process of the action data in the ECU 1 is started when the ignition of the vehicle is turned into the ON state.

At S100, the ECU 1 determines whether the ignition switch of the vehicle is turned into an OFF state. When it is determined that the ignition switch is turned into the OFF state, the present process indicated in the flowchart of FIG. 2 is ended. In contrast, when it is determined that the ignition switch is not turned into the OFF state, the processing proceeds to S110.

At S110, the ECU 1 monitors an action of the vehicle by receiving signals from the sensors that output signals relevant to the action of the vehicle. In detail, as mentioned above, the action data are recorded in the memory of the ECU 1 with predetermined time intervals in the endless loop. At subsequent S120, it is determined that the vehicle exhibits an anomalous action based on the inputted action data. This determination at S120 determines, as the anomalous action of the vehicle, a sudden acceleration, a sudden deceleration (quick stop), and a steep turn, for example. When it is determined that there is occurring no anomalous action, the processing returns to S100. When it is determined that there is occurring an anomalous action, the processing returns to S130.

At S130, as indicated in (a) of FIG. 4, the ECU 1 instructs the other ECUs 2 to 7 to delete or erase the action data recorded in their own memories. Thereby, when the ECU 1 having the earliest recording order records the action data in its own memory, the recorded data stored in the memories of the other ECUs 2 to 7 are erased certainly. Therefore, such a configuration can certainly prevent an occurrence of a data mixture state, where the action data irrelevant to or having a low relation with the newest action data that are recorded in the ECU 1 are left in the memories of other ECUs 2 to 7. At subsequent S140, the ECU 1 records the action data in its own memory. That is, as explained above, the recording of the action data is continued up to a time point when the second predetermined time period elapses since the anomalous action is determined to occur, and then the recording is stopped. Thereby, the ECU 1 records in its own memory (i) the action data before the occurence of the anomalous action for the first predetermined time period minus the second predetermined time period and (ii) the action data after the occurrence of the anomalous action for the second predetermined time period.

At S150, as indicated in (b) of FIG. 4, the ECU 1 outputs a notice (i.e., issue an instruction) to the ECU 2 having or assigned with the next recording order (i.e., the second earliest recording order). The notice instructs the ECU 2 to execute a record process of action data. In other words, the ECU 1 hands over the record process to the ECU 2. Thereby, from just when the occurrence of the anomalous action is determined in the ECU 1, the ECU 2 having the following recording order can start the recording of the action data. At S160, the ECU 1 waits until receiving a notice indicating that no new anomalous action of the vehicle arises within a third predetermined time period since the start of the recording the action data from one of the ECUs 2 to 7 containing the ECU 2. When receiving the notice, the processing returns to S100. In other words, the ECU 1 takes back the record process from one of the other ECUs 2 to 7.

Second, with reference to FIG. 3, a record process of action data is explained with respect to one subject ECU that is among the ECU 2 to 7 other than the ECU 1 having an earliest recording order. As indicated in the flowchart of FIG. 3, the record process of the action data in the subject ECU 2 to 7 is also started when the ignition of the vehicle is turned into the ON state.

At S200, it is determined whether the ignition switch of the vehicle is turned into an OFF state. When it is determined that the ignition switch is turned into the OFF state, the present process indicated in the flowchart of FIG. 3 is ended. In contrast, when it is determined that the ignition switch is not turned into the OFF state, the processing proceeds to S210.

At S210, it is determined whether a notice (also referred to as an erasure instruction) is received from the ECU 1 having the earliest recording order. The erasure instruction instructs the subject ECU 2 to 7 to erase or delete the action data that have been recorded in their own memories. When it is determined that the erasure instruction is received, the processing proceeds to S220, where the subject ECU 2 to 7 deletes the action data recorded in the own memory.

At following S230, the subject ECU 2 to 7 determines whether a notice is received from any one of the other ECU 1 to 6 that precedes the subject ECU 2 to 7 in the recording order. The notice is to instruct the subject ECU 2 to 7 to execute the record process of action data. In this determination at S230, when it is determined that no notice is received, the processing returns to S200. When it is determined that the notice is received, the processing proceeds to S240.

At S240, the subject ECU 2 to 7 monitors an action of the vehicle by receiving signals from the sensors that output signals relevant to the action of the vehicle. This processing is the same as that of S110 of the flowchart of FIG. 2 mentioned above. At following S250, it is determined whether the vehicle exhibits an anomalous action based on the received action data. This determination at S250 is the same as that of S120 of the flowchart of FIG. 2 mentioned above. When it is determined that there is occurring no anomalous action, the processing returns to S280. When it is determined that there is occurring an anomalous action, the processing returns to S260.

At S280, it is determined whether the third predetermined time period elapses since receiving the notice from the other ECU 1 to 6 preceding the subject ECU 2 to 7 in the recording order. When it is determined that the third predetermined time period does not elapse, the processing returns to S240. When it is determined that the third predetermined time period elapses, the processing proceeds to S290.

At this S280, as indicated in (b) of FIG. 4, the ECU 2 following the ECU 1 in the recording order monitors whether an anomalous action occurs in the vehicle for the third predetermined time period since receiving the notice from the ECU 1. When the anomalous action occurs in the vehicle within the third predetermined time period, the determination at S250 is affirmed to thereby advance the processing to S260. At S260, as indicated in (c) of FIG. 4, the subject ECU 2 to 7 records or stores the action data in its own memory. At S270, the subject ECU 2 to 7 outputs a notice to the other ECUs 3 to 7 following the subject ECU 2 to 7 in the recording order. The notice is to instruct the following ECUs 3 to 7 to execute a record process of action data.

Then, as long as an anomalous action occurs in the vehicle repeatedly within the third predetermined time period since the occurrence of the previous anomalous action or within the third predetermined time period between adjacent anomalous actions, the ECUs 2 to 7 individually execute the record processes of recording the action data or action data sets successively according to the recording order, as indicated in FIG. 4.

The vehicular data record apparatus according to the present embodiment regards, as a series of action data or action data sets that have close relation or close association with each other, the following case where since the first occurrence of a first anomalous action in the vehicle, several following anomalous actions occur successively while each of the following anomalous actions occurs within the third predetermined time period since the occurrence of a preceding anomalous action that is one of the first anomalous action and the following anomalous actions preceding the each of the following anomalous actions. When it is determined that the action data or action data sets belong to a series of action data or action data sets, the series of action data sets are recorded or stored serially or consecutively in the memories of the ECUs 1 to 7 in the recording order, respectively. Therefore, it becomes possible to easily extract a series of action data sets from the memory of each ECUs 1 to 7 serially or in a chronological order.

In contrast, when a time interval between the occurrences of the adjacent anomalous actions becomes greater than the third predetermined time period, at S290, the subject ECU 2 to 7 transmits a notice, which indicates that no new anomalous action occurs within the third predetermined time period, to the ECU 1 having the earliest recording order, as illustrated in (e) of FIG. 4.

Further, the vehicular data record apparatus according to the present embodiment regards, as an independent action data or data set, the following case where a following second new anomalous action occurs after the third predetermined time period elapses since the occurrence of a first previous anomalous action preceding the second new anomalous action. Then, this independent action data or data set is stored in the memory of the ECU 1 having the earliest recording order while any action data recorded in the other ECUs 2 to 7 are erased at the same time.

The vehicular data record apparatus according to the present embodiment is thus configured to store only one of (i) a series of action data or data sets having a close relation with each other and (ii) an independent action data or data set, in the memories of the ECUs 1 to 7. In other words, when the newest action data is stored, the past or older action data are erased completely. Even though an anomalous action of the vehicle occurs and a corresponding action data is recorded, there is a case that the vehicle is thereafter used again and a new anomalous action occurs, the older recorded action data is unnecessary for analysis. In such a case, a new action data should be recorded preferentially.

It is noted that when the subject ECU becomes the ECU 7 having the latest recording order or the ECU 7 executes the action record process in the flowchart of FIG. 3, S270 is not executed. This is because the latter ECU in the recording order does not exist. In this case, in the record process with respect to the ECU 7 having the latest recording order, after S260, the processing repeats from S200. In this case, after once receiving the notice from the ECU 6 preceding the ECU 7 in the recording order, the determination at S230 is supposed to be affirmed unless notifying the ECU 1 at S290, by using a flag or the like.

Therefore, when the ECU 7 having the latest recording order starts recording the action data in response to the occurrence of an anomalous action and an anomalous action of the vehicle occurs again within the third predetermined time period since the start of the recording, the new action data is written over the action data that have been recorded.

The number of ECUs 1 to 7 is limited (e.g., seven in the present embodiment). There may be a case where the number of action data sets which should be recorded as a series of action data sets may exceed the number of action data or data sets recordable in the ECUs 1 to 7. Such a case cannot be denied. In order to correctly analyze, from a series of action data or data sets, the cause of the anomalous vehicle actions that have occurred repeatedly each within the predetermined time period since the occurrence of the preceding anomalous action, the action data in early stages of the anomalous action occurrence duration have an important key in many cases, in particular. Therefore, the number of the action data which should be recorded may exceed more than the number of action data recordable in the ECUs 1 to 7. In such a case, a conventional technology overwrites the memories from that of the ECU 1 that stores the oldest action data. In contrast, the present embodiment does not overwrite the memories from the memory of the ECU 1 having the earliest recording order. The present embodiment overwrites the memory of the ECU 7, which has the latest recording order while storing the newest action data among the action data recorded in the ECUs 1 to 7.

The preferred embodiment of the present invention is thus described; however, without being restricted to the embodiment mentioned above, the present invention can be variously modified as long as not deviating from the scope thereof.

For example, the embodiment mentioned above explains the example which constitutes the vehicular action data record apparatus as several ECUs 1 to 7. Further, each ECU 1 to 7 has own memory serving as an archive area or a record area. However, the vehicular action data record apparatus may be configured as a single ECU.

In this case, a memory of the single ECU may be provided with a memory to have several archive areas or record areas to store several action data or data sets. Those several archive areas may be assigned with a recording order for the action data. Further, an independent action data or data set is recorded in the earliest archive area in the recording order. Simultaneously, the action data currently recorded in other archive areas are erased. In contrast, a series of action data or data sets can be recorded in the several archive areas in the recording order.

In addition, the action data may be attached with time data. The time data enables an easy investigation of the cause of the occurrence of the anomalous action of the vehicle from a series of action data.

In addition, the vehicular action data record apparatus according to the present invention can be applied to a usual vehicle having an engine as a power source. In particular, it is desirable to apply it to a hybrid vehicle having in common an engine and a motor as a power source. The hybrid vehicle generates power (torque) in the two sources of the engine and the motor. Therefore, the hybrid ECU calculates necessary torques of the engine and the motor according to the driver's acceleration requirement (accelerator pedal stepping amount), and outputs them to an ECUs which control the engine and the motor, respectively. Then, the ECUs control the engine and the motor, respectively, according to the calculated necessary torques. That is, the torques of the vehicle are controlled by several ECUs. Such a configuration provides a high possibility that an anomalous action of the vehicle be caused to occur because of the connective operation of several ECUs as compared with a usual vehicle.

It will be obvious to those skilled in the art that various changes may be made in the above-described embodiments of the present invention. However, the scope of the present invention should be determined by the following claims.

What is claimed:

1. A vehicular action data record apparatus for a vehicle, the apparatus comprising:

an action data output section to output action data relevant to an action of the vehicle;

a record section to record the action data;

an anomaly determination section to determine whether an action of the vehicle is anomalous based on the action data outputted by the action data output section to identify an anomalous action; and a record control section to execute a record process to cause the record section to record action data relevant to an anomalous action of the vehicle when the anomalous action is identified by the anomaly determination section, the record section containing a plurality of archive areas, each of which is enabled to record a single action data set that contains at least one action data relevant to an anomalous action, the plurality of archive areas being enabled to record the action data sets, respectively, in a predetermined recording order relative to the record process, wherein:

in cases that an occurrence time interval between adjacent anomalous actions that are identified by the anomaly determination section is within a predetermined time period, the record control section is further configured to cause the record section to record action data sets relevant to the adjacent anomalous actions, which are identified by the anomaly determination section, in different archive areas of the plurality of archive areas according to the recording order, respectively; and in cases that an occurrence time interval between adjacent anomalous actions that are determined by the anomaly determination section exceeds the predetermined time period, the record control section is further configured to cause the record section to record a newer action data set relevant to a newer anomalous action of the adjacent anomalous actions, which are identified by the anomaly determination section, by overwriting an earliest ordered archive area, which is earliest in the recording order among the plurality of archive areas, and to cause other archive areas, which is among the plurality of archive areas and other than the earliest ordered archive area, to erase all past action data sets that are recorded in the other archive areas, respectively.

2. The vehicular action data record apparatus according to claim 1, wherein, in cases that a state where the occurrence time intervals between the adjacent anomalous actions that are determined by the anomaly determination section is within the predetermined time period is consecutively repeated so that a number of the action data sets, which are determined to be recorded, exceeds a number of action data sets that are enabled to be recorded in the plurality of archive areas of the record section, the record control section causes the record section to record a newest action data set by overwriting a latest ordered archive area that is latest in the recording order among the plurality of archive areas.

3. The vehicular action data record apparatus according to claim 1, further comprising:

a plurality of electronic control units that are communicated with each other via a network, the plurality of electronic control units at least including a first electronic control unit having a first own memory serving as the earliest ordered archive area, and a second electronic control unit having a second own memory serving as a second earliest ordered archive area in the recording order, the first electronic control unit being configured, when the first electronic control unit determines that an action of the vehicle is anomalous to identify an anomalous action, to (i) record an action data set relevant to the identified anomalous action in the first own memory, (ii) instruct remaining electronic control units that are the plurality of electronic control units, which contain the second electronic control unit but excluding the first electronic control unit, to erase action data sets that are recorded in own memories serving as the archive areas of the remaining electronic control units, respectively, (iii) hand over a record process, which is executed when an anomalous action is identified, to the second electronic control unit, the first electronic control unit being further configured to take back the record process from the second electronic control unit when an anomalous action does not then occur in the vehicle within a predetermined time period.

4. The vehicular action data record apparatus according to claim 3, wherein:

the record process executed when the action of the vehicle is an anomalous action data is handed over to a latest electronic control, which is latest in a handing-over order among the plurality of electronic control units; and in cases that an action data needed to be recorded further occurs after the record process executed when an anomalous action is identified is executed in the latest electronic control unit, the latest electronic control unit records the action data needed to be recorded by overwriting an own memory of the latest electronic control unit.

* * * * *